United States Patent [19]
Hivert et al.

[11] Patent Number: 5,111,657
[45] Date of Patent: May 12, 1992

[54] PROPULSION DEVICE COMPRISING A BLOCK OF PROPELLANT PROVIDED WITH A CENTRAL DUCT OF VARIABLE SECTION

[75] Inventors: Michel Hivert, Merignac; Raymond Coleno, Saint-Aubin De Medoc, both of France

[73] Assignee: Societe Nationale Des Poudres et Explosifs, Paris, France

[21] Appl. No.: 536,463

[22] Filed: Jun. 12, 1990

[30] Foreign Application Priority Data

Jun. 15, 1989 [FR] France ................................ 89 07907

[51] Int. Cl.$^5$ ................................................ F02K 9/10
[52] U.S. Cl. .......................................... 60/224; 60/253
[58] Field of Search ................... 60/252, 254, 224; 102/286, 287, 288

[56] References Cited

U.S. PATENT DOCUMENTS

| | | | |
|---|---|---|---|
| 1,901,852 | 3/1933 | Stolfa et al. | 60/253 |
| 4,148,187 | 4/1979 | Younkin | 102/287 |
| 4,738,100 | 4/1988 | Koorey | 60/253 |
| 4,856,276 | 8/1989 | Solberg | 102/287 |

OTHER PUBLICATIONS

Barrere, Marcel et al. *Rocket Propulsion*, Elsevier Publ. Co., New York, 1960, pp. 345–347.

*Primary Examiner*—Richard A. Bertsch
*Assistant Examiner*—Timothy S. Thorpe
*Attorney, Agent, or Firm*—Cushman, Darby & Cushman

[57] ABSTRACT

The invention concerns a propulsion device for acceleration of a self-propelled engine, such as a missile or a rocket. The propulsion device comprises a body (1) equipped with a nozzle (2) and a block of propellant (3) having a longitudinal central duct (4) of variable section. The block of propellant comprises a downstream part (5) having a cylindrical duct (6) which has a circular section whose diameter is less than two thirds of the diameter of the throat of the nozzle (2) and an upstream part (7). The duct (8) of this upstream part (7) on the one hand has a diameter which exceeds the diameter of the duct (6) of the downstream part and is less than the diameter of the throat of the nozzle (2), and on the other hand is connected to the duct (6) of the downstream part by a portion in the shape of a truncated cone (9). The length of this upstream part (7) is on the one hand between two and four times the external diameter of the block of propellant and on the other hand less than the length of the downstream part (5), the total length of the block of propellant being more than six times the external diameter of the block of propellant.

4 Claims, 2 Drawing Sheets

PROPULSION DEVICE COMPRISING A BLOCK OF PROPELLANT PROVIDED WITH A CENTRAL DUCT OF VARIABLE SECTION

The invention relates to a propulsion device for acceleration of a self-propelled engine, such as a missile or a rocket, this type of propulsion device comprising a body equipped with a nozzle and a block of propellant having a longitudinal central duct of variable section.

A propulsion device for acceleration must be equipped with a propellant block whose combustion enables a large pressure to be obtained at the end of the flight to permit the missile to reach its objective rapidly without the risk of being destroyed by an intervention device. However, it is also desirable that the combustion of this propellant block produces a high pressure at the start of the flight in order to permit the missile to move away rapidly from its launching site, on the one hand to avoid its being located and on the other hand to reduce as far as possible the time during which the launching means of the missile is subjected to the gases generated by the combustion of the propellant block.

From the prior art a large number of propulsion devices for acceleration operating with a nozzle are known. This type of propulsion device is in general equipped with a propellant charge whose combustion enables a high final pressure to be obtained. To permit a large acceleration to be obtained at the start of the flight, numerous devices have been proposed. For example European Patent no. 184 014 describes a block of propellant equipped with an initiation device disposed at the actual interior of its central duct. These devices are mostly complex in their operation and excessively complicate the manufacture of the propulsion devices while thus increasing their cost.

It is also known from the prior art, for example from the French Patent no. 1,336,660, to use propulsion devices known as nozzleless propulsion devices, operating without nozzle during the whole duration of combustion of the propellant. However, this type of propulsion device presents numerous disadvantages. The operation without nozzle leads, in fact, to obtaining, as regards the internal ballistic performance of the charge, a degressive pressure and a progressive thrust, which causes a loss of specific impulse linked with the degressivity of the pressure. Another disadvantage is the misalignment of the thrust with the axis of the propulsion device, during the course of operation. As regards the ballistic characteristics, the specific impulse of the charge is worse than in the case of a propulsion device operating with a nozzle.

The invention proposes a new propulsion device for acceleration enabling a high initial pressure to be obtained at the start of operation and a high final pressure at the end of operation, while not showing the disadvantages of the prior art.

Another purpose of the invention is to provide a propulsion device for acceleration having moreover an excellent coefficient of filling by propellant and capable of being manufactured according to a simple manufacturing process.

The invention has for its subject matter a propulsion device for acceleration comprising a body equipped with a nozzle and a block of propellant including a longitudinal central duct of variable section. The invention is characterized in that the block of propellant comprises on the one hand a downstream part having a cylindrical duct which has a circular cross-section whose diameter is less than two thirds of the diameter of the throat of the nozzle, and on the other hand an upstream part whose axial duct has a diameter greater than the diameter of the duct of the downstream part and less than the diameter of the throat of the nozzle, the upstream duct, being connected to the downstream duct by an axial duct in the shape of a truncated cone. The length of the upstream part is on the one hand between two and four times the external diameter of the block of propellant and is on the other hand less than the length of the downstream part, the total length of the block of propellant being more than six times the external diameter of the block of propellant.

According to a preferred aspect, the diameter of the throat of the nozzle is between one third and one half of the diameter of the block of propellant.

Advantageously, the axial duct of the upstream part has a circular section.

Also preferentially, the length of the portion in the shape of a truncated cone connecting the ducts is between one quarter of and one and a half times the external diameter of the block of propellant.

The advantages obtained thanks to this invention consist essentially in that it is possible to combine the advantages of the propulsion devices operating with nozzle or nozzleless, the propulsion device according to the invention having a first phase of nozzleless operation and a second phase of operation with nozzle, which notably enables, in addition to the advantages linked with the developments of the pressure, the mass of propellant contained in the propulsion device to be increased and the misalignment of the thrust in the course of operation to be considerably limited, the vectors of the initial and final thrusts coinciding with the axis of the propulsion device.

Such a propulsion device can be manufactured according to conventional methods from a non-detachable propulsion device body already provided with a nozzle and also provided with an opening upstream. Advantageously, a propulsion device body will be used which has been obtained by winding round a bonding material, so as not to have to place this material subsequently. The first step, which is optional, consists of coating, before the introduction of the propellant, the interior of the propulsion device with an inhibitor enabling the propellant to adhere to the thermal insulation. In this case, it is not necessary to coat the whole interior of the propulsion device body; it suffices that the convergent and divergent parts of the nozzle be coated to ensure the adhesion of the propellant on these zones. The second step consists of introducing to the interior of the body of the propulsion device, through the upstream opening or through the downstream opening, a core in order to be able to create the shape of the central duct of the block of propellant, of casting or injecting the propellant into the interior of the body of the propulsion device and of causing it to crosslink. The last step consists of stripping the block of propellant by withdrawing a part of the core through the upstream opening of the structure and the remaining part through the downstream opening.

The propellant used is of conventional type. It must however permit a correct operation of the propellant at high pressure (preferably up to 20 MPa).

The operation of such a charge can be broken down as follows: a first phase of nozzleless operation whose duration can be quite short, during which the pressure is decreasing slightly; and a second phase during which the operation of the charge is linked to the diameter of the nozzle and during which the pressure is increasing and then decreasing.

The invention is more precisely described below, with reference to FIGS. 1, 2 and 3.

Figure 1:
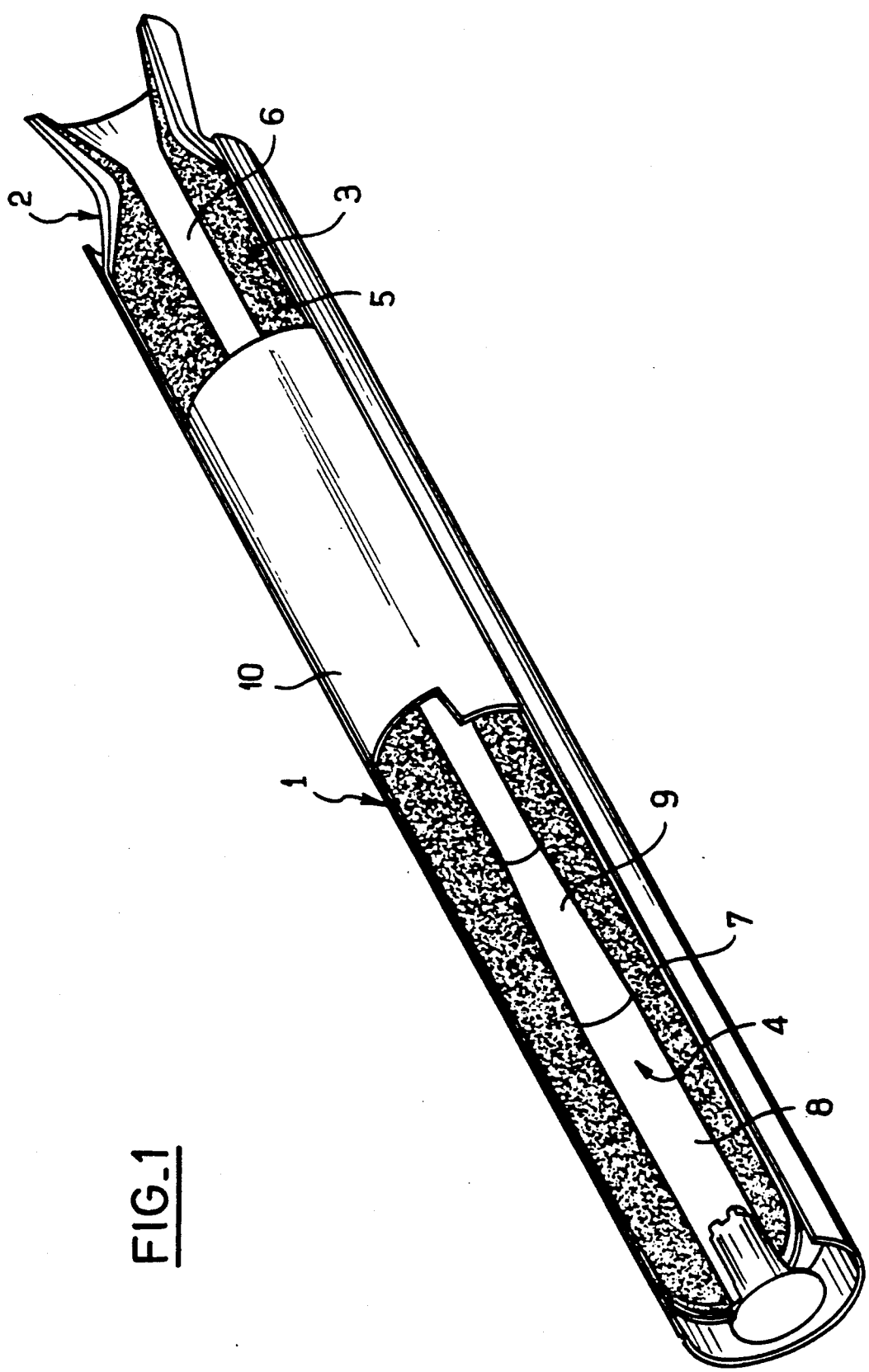
FIG. 1 represents a partial section in perspective of a propulsion device for acceleration according to the invention.

The propulsion device according to the invention consists of a body 1 provided with a nozzle 2 and with a block of propellant 3 having a longitudinal central duct 4 of variable section. The block of propellant is united with the body of the propulsion device thanks to a bonding material 10. The total length of the propulsion device is 1500 mm and its internal diameter is 135 mm. The downstream part 5 of the block of propellant 3 has a cylindrical axial channel 6 having a circular section of 34 mm and a length of 900 mm. The upstream part 7 of the block of propellant 3 has a length of 330 mm and has a cylindrical axial channel 8 having a circular section of 53 mm. The ducts 6 and 8 are connected together by a portion 9 in the shape of a truncated cone, having a length of 170 mm and a diameter going from 53 to 34 mm. The nozzle 2 has an opening whose diameter is very slightly greater than 53 mm.

The propellant utilized is a BUTALITE propellant (registered trade mark of SNPE), that is to say made up essentially of 86 % of fillers of which 1 to 2% is aluminium and catalyzed by a ferrocene-containing catalyst, which has a burning rate of 23 mm/s at 7 MPa.

The bonding material used is of the EPDM (ethylene propylene diene monomer) rubber type.

The technical specifications of the missile having as accelerator the propulsion device according to the example are the following:

Range: 5 to 6000 m
Mean velocity of the missile: 1000 m/s
Maximum longitudinal acceleration: 150 to 160 g
Total mass of the missile: 60 kg
Operating range: −40° C. to +60° C.

Figure 2:
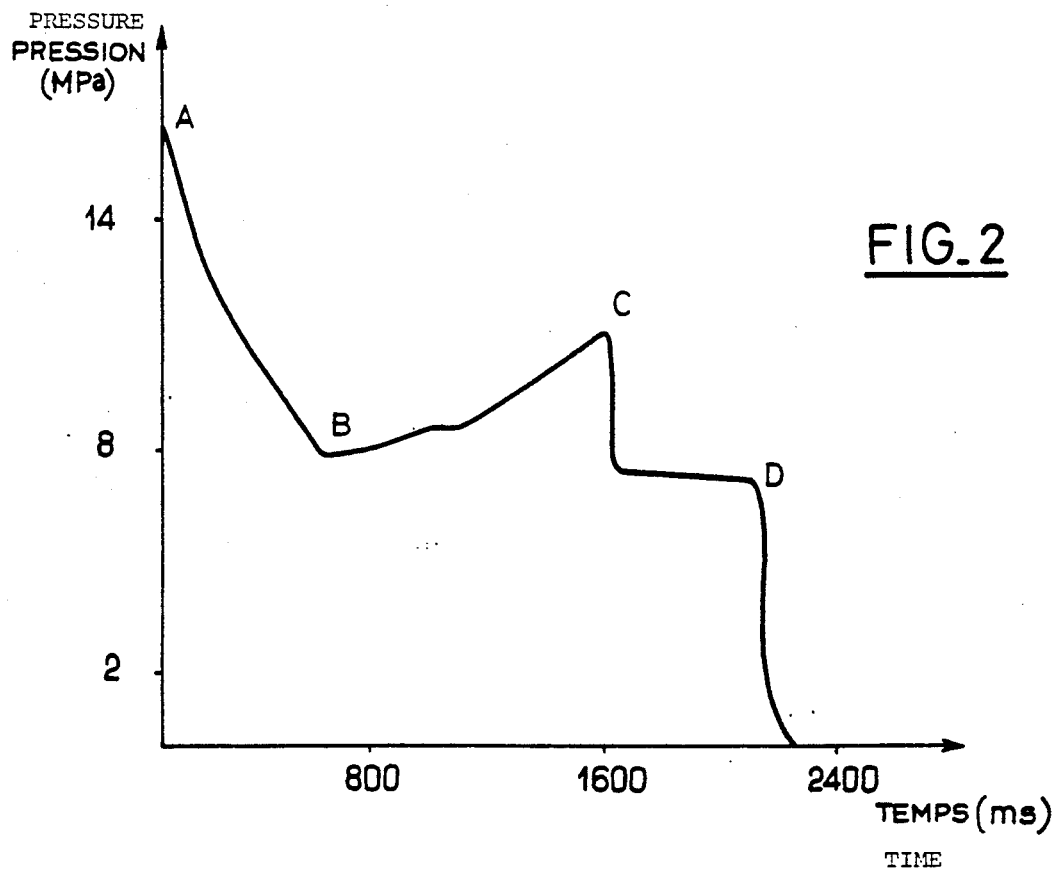
FIG. 2 represents the curve of pressure as a function of time obtained during the operation of such a propulsion device.
Figure 3:
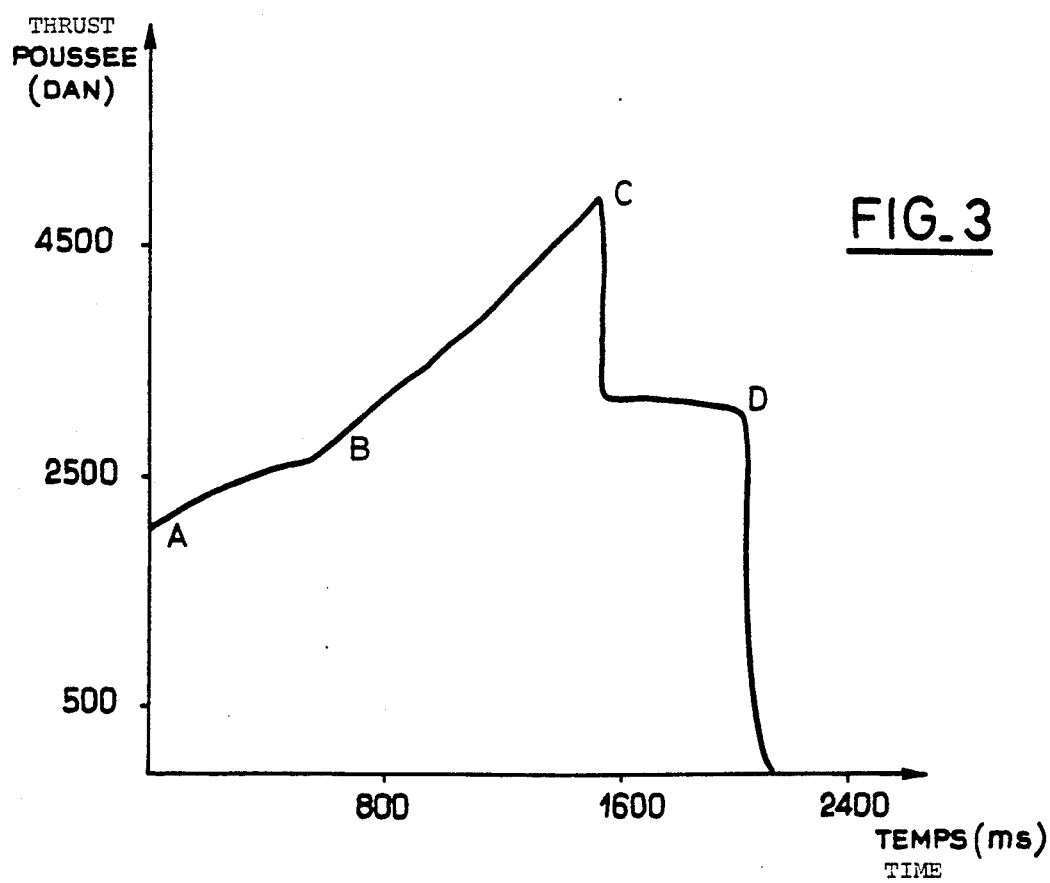
FIG. 3 represents the curve of thrust as a function of time.

Referring to FIGS. 2 and 3, the operation of such a propulsion device can be broken down into two phases:

the first phase, corresponding on FIGS. 2 and 3 to the part of the curves situated between the points A and B, during which the operation of the propulsion device is of nozzleless type. During this phase of operation, the ratio of the diameter of the nozzle 2 to the diameter of the axial channel of the downstream part 5 of the block of propellant decreases while remaining greater than 1. Consequently the pressure, which is initially high, decreases and the thrust increases slightly.

a second phase, corresponding on FIGS. 2 and 3 to the part of the curves situated between the points B and C, during which the operation of the propulsion device is of the type with nozzle. At the point B, the diameter of the axial channel of the downstream part 5 of the block of propellant is equal to the diameter of the nozzle 2. The pressure is a minimum. Then the ratio between the two diameters becomes less than 1 and the pressure as well as the thrust increases strongly up to the point C, thanks to the operation with nozzle. At the point C the pressure and the thrust are at their maximum. The consumption of the upstream part 7 of the propellant block is completed. As soon as this upstream part is completely consumed, the pressure and the thrust fall suddenly, because only the part 9 in the shape of a truncated cone and the downstream part 5 continue to participate in the combustion. The pressure and the thrust fall to a plateau level represented by the parts of the curves 2 and 3 between the points C and D, until the end of combustion.

The performance of the missile equipped with a propulsive device according to the invention is defined in Table 1.

TABLE 1

| Temperature | (°C.) | 20 |
|---|---|---|
| Maximum pressure | (MPa) | 17 |
| Maximum thrust | (N) | 50000 |
| Ift * | (N.s) | 65965 |
| Duration | (s) | 2 |
| Weight | (kg) | 29.950 |

* Ift is the total impulse.

We claim:

1. Propulsion device comprising a body (1) equipped with a nozzle (2) including a convergent and a divergent portion and a block of propellant (3) having a longitudinal central duct (4) of variable section, characterized in that the block of propellant covers the convergent and divergent portion of said nozzle, and comprises a downstream part (5) having a cylindrical duct (6) which has a circular section whose diameter is less than two thirds of the diameter of the throat of the nozzle (2) and an upstream part (7) whose duct (8) on the one hand has a diameter which exceeds the diameter of the duct (6) of the downstream part and is less than the diameter of the throat of the nozzle (2), and on the other hand is connected to the duct (6) of the downstream part by a portion in the shape of a truncated cone (9), the length of this upstream part (7) being on the one hand between two and four times the external diameter of the block of propellant and on the other hand less than the length of the downstream part (5), the total length of the block of propellant being more than six times the external diameter of the block of propellant.

2. Propulsion device according to claim 1, characterized in that the diameter of the throat of the nozzle (2) is between one third and one half of the diameter of the block of propellant (3).

3. Propulsion device according to claim 1 or claim 2, characterized in that the duct (8) of the upstream part (7) has a circular section.

4. Propulsion device according to one of the preceding claims, characterized in that the length of the portion in the shape of a truncated cone (9) which connects the ducts is between one quarter of and one and a half times the external diameter of the block of propellant.

* * * * *